United States Patent [19]

Shibata et al.

[11] Patent Number: 4,891,568

[45] Date of Patent: Jan. 2, 1990

[54] SERVO MOTOR SYSTEM FOR TRANSPORTATION

[75] Inventors: Yoichi Shibata; Naoto Tazuke, both of Toyota; Yoshio Shinohara, Owariasahi; Akira Shima, Nagoya, all of Japan

[73] Assignee: Toyota Jidosha Kabushiki Kaisha, Toyota, Japan

[21] Appl. No.: 239,368

[22] Filed: Sep. 1, 1988

[30] Foreign Application Priority Data

Sep. 4, 1987 [JP] Japan .................. 62-221327

[51] Int. Cl.⁴ .............................................. G05B 19/28
[52] U.S. Cl. ...................................... 318/560; 318/601; 318/603; 318/632; 198/856; 198/460; 198/461; 198/577; 388/812
[58] Field of Search ............... 318/571, 577, 578, 392, 318/396, 445, 592, 593, 594, 600, 601, 602, 603, 605, 626, 627, 628, 640, 687, 804, 811, 819, 878, 829, 831, 632, 812; 271/202, 203, 154, 155, 216, 199, 270, 258, 259; 148/502.4, 460, 461, 466, 418, 419.2, 577, 674, 675, 761, 762, 782, 783, 784, 788, 789, 790, 792, 854, 855, 856, 857, 858; 250/223 R

[56] References Cited

U.S. PATENT DOCUMENTS

| | | | |
|---|---|---|---|
| 3,906,319 | 9/1975 | Milligan | 388/812 |
| 3,940,675 | 2/1976 | Schroeder | 318/601 X |
| 4,090,118 | 5/1978 | Smith, Jr. | 318/396 X |
| 4,091,315 | 5/1978 | Hayashi et al. | 318/632 X |
| 4,099,113 | 7/1978 | Hayashi | 318/632 |
| 4,211,967 | 7/1980 | Akiyama et al. | 388/812 X |
| 4,266,276 | 5/1981 | Hayashi et al. | 318/601 X |
| 4,316,131 | 2/1982 | Miyamoto et al. | 318/612 |
| 4,419,613 | 12/1983 | Ichinose et al. | 318/632 |
| 4,528,491 | 7/1985 | Takeuchi et al. | 318/568.1 X |
| 4,602,196 | 7/1986 | Matsui | 318/603 |

Primary Examiner—William M. Shoop, Jr.
Assistant Examiner—Paul Ip
Attorney, Agent, or Firm—Finnegan, Henderson, Farabow, Garrett and Dunner

[57] ABSTRACT

A servo motor system for a transportation line with the travel distance of the article predetermined and with a relatively low positioning accuracy. Basically, the system is constructed as an incremental servo motor system in which an incremental movement of the motor is detected, and the incremental movement signal is fed back to a motor driver, which also receives pulse signals from a controller corresponding to a traveling distance to a destination. Only one time after starting the operation of the servo motor system with the article not at the destination point, a stop signal is fed from an external signal generator located at the destination point to the motor driver, which stops the motor there. At this time, a coordinate system of the movable space of the article is established in the controller and the servo motor system is operated as an incremental system from the second time on, without utilizing an external signal generator.

6 Claims, 3 Drawing Sheets

SERVO MOTOR SYSTEM FOR TRANSPORTATION

BACKGROUND OF THE INVENTION

This invention relates to a servo motor system of a transportation line for conveying an article such as a workpiece for assembly or machining, and more particularly to a system with a predetermined travel distance having a low positioning accuracy such as greater than 0.1 mm.

Two typical conventional transportation servo motor systems are the incremental system, as shown by FIG. 5A, and the absolute system, as shown by FIG. 5B. In the incremental system, a detector 55 of a servo motor 54 outputs a signal to a counter 52 and amplifier 53 of the motor driver 58 indicative of an incremental distance the article is moved by the motor 54, but not the absolute position of the article. The coordinate system of the movable space of the article is defined in a controller 51 when the article is positioned at a definite point in the transportation line, which is defined as the origin of the coordinate system. In the absolute system, however, a detector 67 outputs a signal indicative of an absolute position of a servo motor 64 in the whole movable space of the article to a motor driver 68. The coordinate system is defined in controller 66 by receiving the absolute position signal from the detector 67. Namely, in the absolute system, the servo motor system can perform normal operation immediately after the power to the system is turned on, because the absolute position of the article, wherever it is, can be always known by the controller 66. In the incremental system, however, normal operation of the servo motor system cannot be started before the article is first brought to the origin of the coordinate system after the power is first turned on.

But the absolute system has a drawback in that the detector 67 must be complex, and the increase in the amount of data to be processed in the controller 66 and the amplifier 63 increases their cost. Elongated wiring of the whole system also increases the total cost of the system.

The basic requirement for the servo motor system in general, is to drive the servo motor precisely in accordance with the controlled amount, however complicated it is. For that purpose, feedback data, such as the position (P), velocity (V) and current (I), is continuously fed to the motor driver 58 or 68, because the driver 58 or 68 directly controls the movement of the motor 54 or 64. On the other hand, in most cases, the feedback data is not always fed to the controller 51 or 66, because in practice it is difficult to externally control the motor 54 or 64 by the controller 51 or 66 when the minimum incremental moving distance is very small. For example, the minimum incremental moving distance corresponding to one pulse is as small as 1.0 to 0.1 micrometer in the control of numerically controlled (NC) machine tools.

Though it is shown in FIG. 5B that the controller 66 receives feedback data of the absolute position from the detector 67, it is done only at the start of the operation in order to establish the coordinate system and the controller 66 does not receive the feedback data afterwards. It can be said, therefore, that the control of the motor 54 or 64 by the incremental system is essential to the absolute system as well as the incremental servo motor system.

After the development of the AC servo motor, the servo motor has been widely applied and they are now often used in transportation systems. This is because the quick and accurate movement of the servo motor is quite suitable for driving a transportation line.

In a transportation system for conveying articles having dimensions in the order of meters, the positioning accuracy in the order of millimeters, such as greater than 0.1 mm, is sufficient. This is greatly different from the accuracy required in the NC machine tools by $10^3$ to $10^4$ orders of magnitude.

Safety is always most important in designing a system and it is especially important for the transportation system because the conveyed articles are usually big, the running speed is rather high, and the traveling distance is long. It is, therefore, necessary to always recognize the position of the article. In this respect, the absolute servo motor system is preferable to the incremental system since the incremental system requires excessive movement for bringing the article to the origin of the coordinate system.

As explained so far, no prior art servo motor system, neither the incremental system nor the absolute system, are suitable for the transportation system in which the travel distance is predetermined and the positioning accuracy is low (greater than 0.1 mm).

There already exists a servo motor system appropriate for transportation. The servo motor system includes: an incremental controller; an incremental detector; a first external signal generator for providing the servo motor with a low speed signal upon detecting the article; and a second external signal generator for providing the servo motor with a stop signal upon detecting the article. In this system, the article is conveyed, utilizing the incremental controller, and the incremental detector normally as an incremental servo motor system, but, at required times, the incremental controller is corrected by signals from the first and second external signal generators.

In this system, however, the moving distance of the article is fixed. When the moving distance is desired to be changed, the control distance should be changed in the controller. For every stop of the article at the predetermined destination point where the second external signal generator is located, the normal control by the controller is stopped and a clear pulse is input in the motor driver. When the clear pulse is received, the servo motor and the mechanical system tend to jerk and an over-shoot occurs. Alternatively, a speed adjustment at low speed running and a deliberate adjustment of the position of the external signal generator is required in order to avoid such a jerk and over-shoot.

SUMMARY OF THE INVENTION

The present invention is designed to solve the above problems of the prior servo motor system.

One object of the invention is, therefore, to provide a servo motor system for transportation in which the article does not need to be brought to the origin at the start of the system.

Another object of the invention is to facilitate changing the travel distance of the article. A further object of the invention is to reduce the frequency of jerks and over-shoots in the mechanical system.

In the present invention, the servo motor system for a transportation line includes:

a distance setting means for setting a distance to be traveled by the article, and for generating a distance signal representative of the distance;

an incremental detector for generating an incremental distance signal representative of an incremental distance actually moved by the servo motor;

a controller responsive to the distance signal and the incremental distance signal for generating a control signal for moving the servo motor as far as the distance based on a coordinate system defining a movable space in which the article can travel;

an external signal generator provided at the destination point for generating a stop signal responsive to an arrival of the article at the destination point; and an initial setting means for transmitting the stop signal to the controller only for the first time after the operation of the servo motor system is started with the article not at the destination point, whereby the coordinate system is established.

The initial setting means is operational only for the first time after the power to the servo motor system is turned on, or after the operation of the system is resumed after the article has been stopped at a position other than the destination point. By this initial operation, the absolute position of the article is recognized by the system and, hence, the coordinate system can be established. The initial setting means does not operate and the servo motor system performs its operation thereafter as an incremental system based on the coordinate system thus established, whereby the frequency of the mechanical shocks and overshoots is reduced.

The servo motor system may include a plurality of the distance setting means and a selection switch for connecting one of the plurality of distance setting means to the controller. Each of the distance setting means generates a different distance signal, and one of the distance signals is optionally input into the controller by the selection switch. This eliminates a tedious resetting operation at the distance setting means and reduces cost.

BRIEF EXPLANATION OF THE ATTACHED DRAWINGS

Figure 3A:
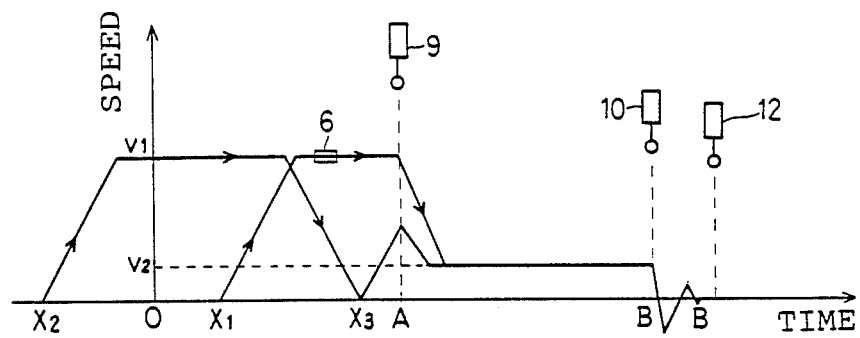
Figure 3B:
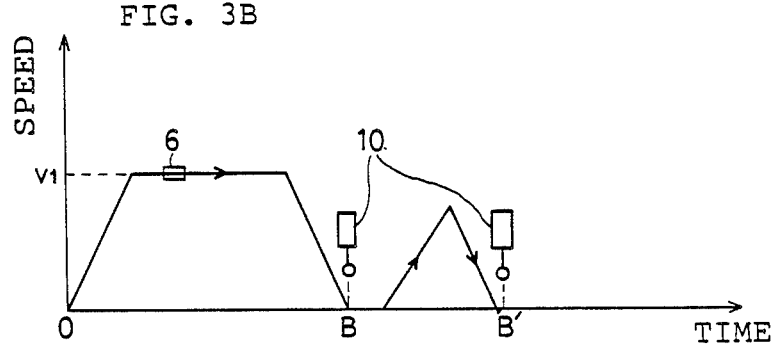
Figure 4:
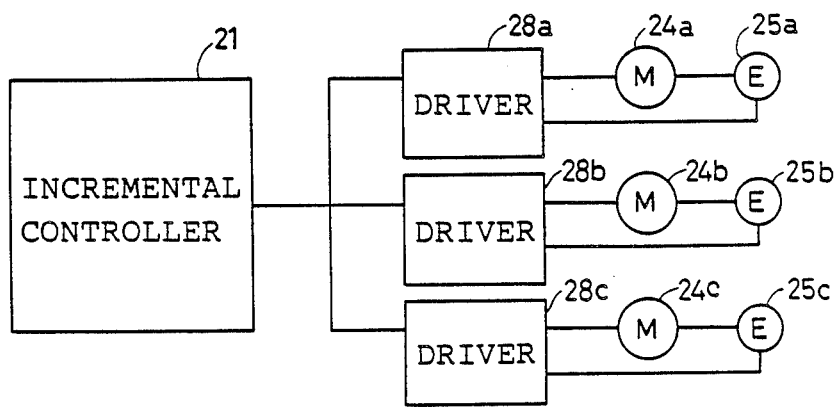
Figure 5A:
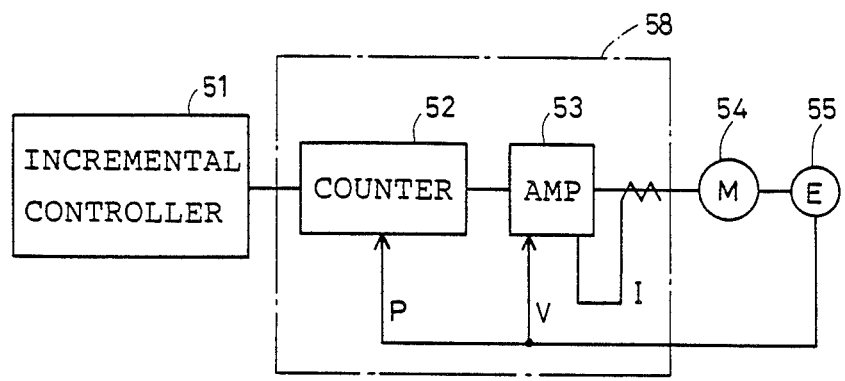
Figure 5B:
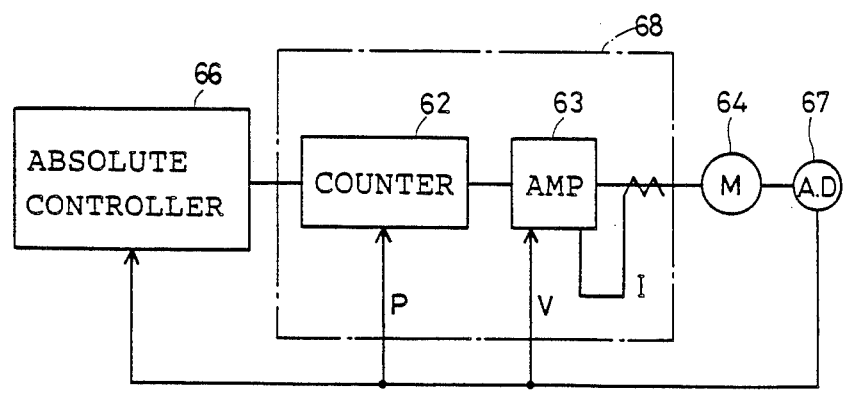

FIG. 3A a diagram showing the movement of the article at the initial stage with respect to time;

FIG. 3B is a diagram showing the movement of the article after the initial stage with respect to time;

FIG. 4 is a block diagram of another embodiment of the invention in which plural servo motors are controlled by one controller; and FIGS. 5A and 5B are block diagrams of conventional servo motor systems.

DETAILED DESCRIPTION OF PREFERRED EMBODIMENTS

Figure 1:
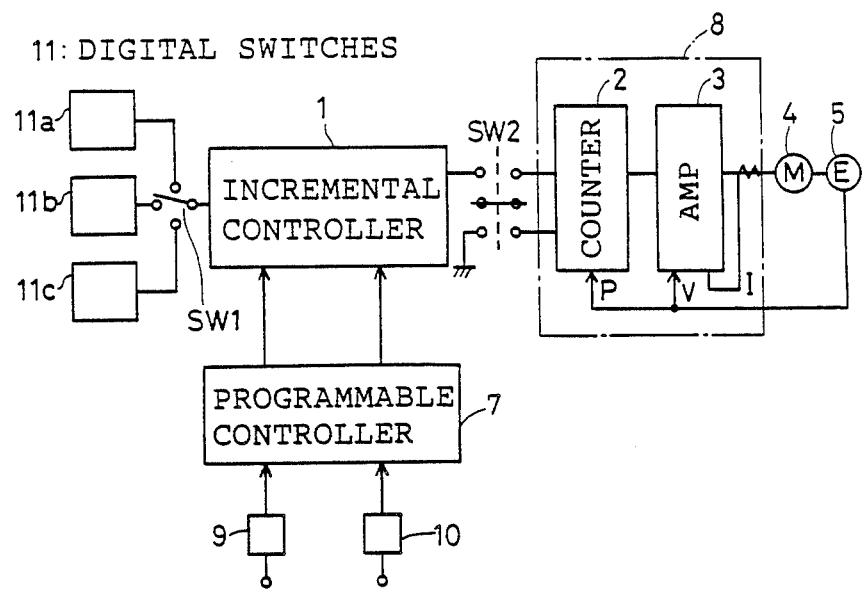
FIG. 1 is a block diagram of an embodiment of the invention.

A preferred embodiment of a servo motor system for transportation according to the present invention is now described. As shown by FIG. 1, a servo motor 4 provided for a transportation line (not shown) is driven by a motor driver 8, which includes a counter 2 and an amplifier 3. An incremental detector 5, which may be an encoder, is provided for motor 4 to detect an incremental distance moved by the motor 4 and a signal from detector 5 is fed to the counter 2 and the amplifier 3. An incremental controller 1 outputs pulses to the counter 2 of the driver 8 via a switch SW2.

Figure 2:
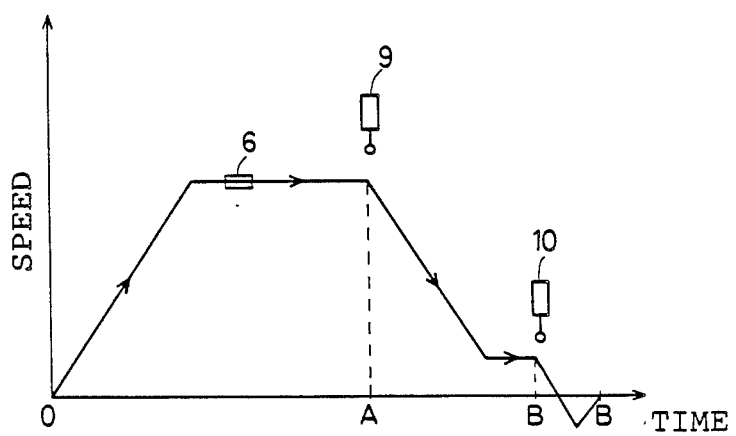
FIG. 2 is a diagram showing the movement of the article with respect to time.

As shown in FIGS. 1 and 2, a first external signal generator 10 is set at a destination point B in the transportation line and a second external signal generator 9 is located at a point A a preset distance before the destination point B. The second signal generator 9 outputs a detection signal to a programmable controller 7 when it detects the passing of article 6 at point A and the incremental controller 1, controls the motor driver 8 to decrease the speed of the motor 4. The first signal generator 10 is connected to the programmable controller 7, which is further connected to the incremental controller 1. Only for the first time after the power to the servo motor system is turned on, or after the article 6 has been stopped at any position other than the destination point B, the programmable controller 7 works as follows. When the first signal generator 10 detects an arrival of the article 6 at the destination point B, the programmable controller 7 prevents the signal from the incremental controller 1 coming into the counter 2 by the switch SW2, and clears any residual pulse signals (which may otherwise be called droops). Namely, the content of the counter 2 is set at 0 at that time, whereby the servo motor 4 is destined to stop there.

Three distance setting digital switches 11a, 11b and 11c are switchable by a switch SW1 for input of the controller 1. The operator can set different distances on the digital switches 11a, 11b and 11c and, by appropriately turning the switch SW1, one of the selected distances is applied to the incremental controller 1. The incremental controller 1 outputs a series of pulses corresponding to the distance selected by one of the digital switches 11a, 11b and 11c connected thereto. This design of plural digital switches 11a, 11b and 11c facilitates pre-operational adjustments of the system. Of course, minute adjustments in the selection distance on each of the digital switches 11a, 11b and 11c is possible similarly to the conventional distance setting digital switches considering an actual stop position of the article, its recurrent positioning accuracy or the operating conditions of the system.

The distance selections can, alternatively, be fed from a known sequence controller instead of the plural digital switches 11a, 11b and 11c.

In the servo motor system as constructed above, the coordinate system of the movable space of the article 6 is established in the incremental controller 1 before normal operation of the system is performed. The establishment of the coordinate system is performed only once just after the power to the system is turned on or, due to an emergency stop or to other causes, after the article 6 has been stopped at any place other than a predetermined starting point (hereinafter referred to as the origin) or the destination point.

Operation of the servo motor system is now explained with reference to FIGS. 3A and 3B. When the starting point of the article 6 is other than the origin O, or the destination point B, initial processing is performed only once. When, for example, the article 6 starts from the point X1 in FIG. 3A which is closer to the destination point B than the origin O, the article 6 is accelerated to reach a preset running speed v1 toward the destination point B. When the article 6 passes the point A, the second external signal generator 9 detects the article 6 and outputs a detection signal to the programmable controller 7, which decelerates the article 6 to a creeping speed of v2. The arrival of article 6 at the destination point B is detected by the first external signal generator 10, which outputs the detection signal to the programmable controller 7. The programmable controller 7, as described above, changes the setting of the switch SW2 to prevent pulses from the incremental controller 1 coming into the counter 2, and clears out residual pulses in the counter 2 to set the counter 2 at "0". When the article 6 overruns the destination point B, a signal corresponding to the difference in the position of the article 6 from the destination point B is fed back from the detector 5 to the counter 2. According to this signal, the article 6 is brought back to the destination point B, as shown in FIG. 3A.

When, on the other hand, the article 6 starts from a point X2 which is farther from the destination point B than the origin O, the article 6 is once stopped after traveling the selected distance at a point X3 which is closer to the destination point B than the origin O. Then, operation similar to the above explanation is performed to bring the article 6 to the destination point B. When the article 6 occasionally stands at the origin O or the destination point B, it is once dislocated therefrom and the same operation as above is performed in order to improve precision of the coordinate system.

When the first signal generator 10 does not detect the article 6 *at a preset time after it is started, the initial processing explained so far is executed. Namely, as the article 6 is assumed to be stopped at a point other than the destination point B, the servo motor 4 is restarted toward the destination point B and the initial processing by the programmable controller 7 is performed as explained before.

A third external signal generator 12 may be provided at an appropriate distance after the destination point B in order to detect an overrun of the article 6. In this case, a predetermined returning program is performed to return the article 6 to the destination point B.

Those are the operations of the first time after the start of the servo motor system. From the second time and after, the servo motor 4 is exclusively controlled by the incremental controller 1, because the coordinate system of the servo motor system has been established by the initial processing. The incremental controller 1 receives a selected distance instruction signal from one of the digital switches 11a, 11b and 11c connected by the switch SW1. The incremental controller 1 generates a series of pulses according to the distance selected by the digital switches 11a, 11b or 11c. Numerical data can be used, instead of the pulses, to inform the travel distance to the motor driver 8. The counter 2 receives those pulses via the switch SW2 which at this time connects the incremental controller 1 and the counter 2. The counter 2 also receives pulses representative of an incremental distance traveled by the article 6 from the detector 5. Based on the difference between those signals, the driver 8 drives the servo motor 4. Consequently, the first and second external signal generators 10 and 9 are not necessary in these cases. Of course, they may be employed for special purposes such as to confirm the arrival of the article 6 at the destination point B or to clear the counter 2 at each arrival.

Another embodiment of the invention is now explained referring to FIG. 4. When the transportation line is long, a thermal elongation is not negligible. In this case, and in other cases, the line is shared by plural servo motors to maintain precision. Providing several small motors instead of one large motor is, for some purposes, better for controlling a large system. FIG. 4 is the block diagram of a part of such servo motor system including three servo motors 24a, 24b and 24c. Similarly to the above first embodiment, an incremental detector 25a, 25b or 25c and a motor driver 28a, 28b or 28c are provided for each motor 24a, 24b or 24c. Because the three motors 24a, 24b and 24c must synchronously operate one line, the three motor drivers 28a, 28b and 28c are controlled by one incremental controller 21. Though not shown in FIG. 4, the programmable controller 7, the switch SW2, the first and second external signal generators 10 and 9 are also provided for this system. Similarly to the above embodiment, plural digital switches 11a, 11b and 11c and the selection switch SW1 may be additionally provided for the incremental controller 21.

In this system, plural servo motors 24a, 24b and 24c can be controlled by one controller 21 owing to the incremental character of the controller 21 and the provision of the external signal generators 9 and 10, especially owing to one 10 located at the destination point B. It reduces cost and contributes to an improvement in reliability of the system when only one controller 21 is necessary to control plural servo motors 24a, 24b and 24c. The more motors used, the more advantageous their effect is.

Obviously, many modifications and variations of the present invention are possible in light of the above teachings. It is therefore to be understood that within the scope of the appended claims, the invention may be practiced otherwise than as specifically described.

What is claimed is:

1. A servo motor system for controlling a servo motor of a transportation line, the system comprising:
   a distance setting means for setting a distance to be traveled by an article and for generating a distance signal representative of the distance;
   an incremental detector for generating an incremental distance signal representative of an incremental distance the article is actually moved by the servo motor;
   a controller responsive to the set distance signal and the incremental distance signal for generating a control signal for operating the servo motor to move the article as far as the set distance based on a coordinate system corresponding to a total movable space of the article;
   an external signal generator provided at a destination point for generating a stop signal responsive to an arrival of the article at the destination point; and
   an initial setting means for transmitting the stop signal to the controller one time subsequent to the starting of the operation of the servo motor system at times when the article is located at a position other than the destination point, for establishing the coordinate system.

2. The servo motor system according to claim 1, wherein the distance setting means comprises a plurality of generating means, each for generating a different-set distance signal, and a selection switch for connecting selectively each of the plurality of generating means to the controller for inputting one of the plurality of different-set distance signals to the controller.

3. The servo motor system according to claim 2, wherein:
   the incremental distance signal generated by the incremental detector includes pulses corresponding to the incremental distance;

the controller comprises a pulse generating means for generating sequence of pulses having a number corresponding to the distance signal, and a counter for storing counts of pulses generated by the pulse generating means and for decreasing the pulse counts by the number of pulses received from the incremental detector to move the article until the counter is zero; and the initial setting means is operative to set the counter at zero in response to the stop signal.

4. The servo motor system according to claim 2, wherein the servo motor system further comprises a second external signal generator preceding the destination point in the directions of travel of the article for generating a low speed signal responsive to a passing of the article, and the controller is operative to decrease the speed of the servo motor in response to the low speed signal.

5. The servo motor system according to claim 4, wherein the servo motor system further comprises a third external signal generator provided at a preset distance following subsequent to the destination point in the direction of travel of the article for generating a return signal responsive to a passing of the article, and the controller is operative to reverse the direction of the servo motor in response to the return signal for returning the article to the destination point.

6. The servo motor system according to claim 2, further comprising a plurality of servo motors and incremental detectors for the transportation line, and the controller is operative to control said plurality of servo motors with a common control signal.

* * * * *